No. 617,262. Patented Jan. 3, 1899.
J. L. STYRON.
ACETYLENE GAS GENERATOR.
(Application filed Aug. 13, 1898.)
(No Model.)
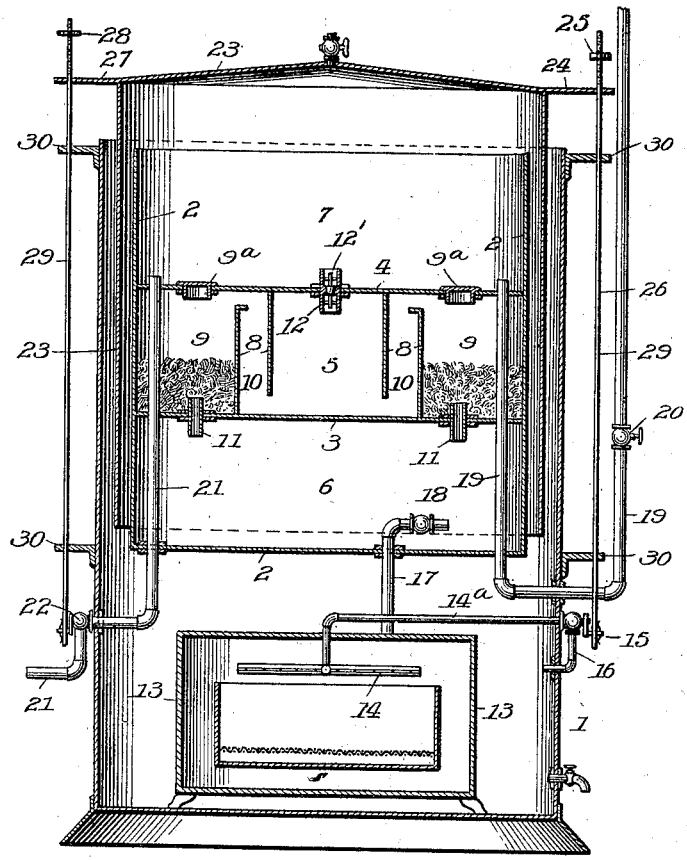
Witnesses:
Harry S. Rohrer
Harry T. Marsh
Inventor:
John L. Styron,
by Finckel & Finckel,
his Attorneys

UNITED STATES PATENT OFFICE.

JOHN L. STYRON, OF NEWARK, OHIO.

ACETYLENE-GAS GENERATOR.

SPECIFICATION forming part of Letters Patent No. 617,262, dated January 3, 1899.

Application filed August 13, 1898. Serial No. 688,541. (No model.)

*To all whom it may concern:*

Be it known that I, JOHN L. STYRON, a citizen of the United States, residing in the city of Newark, in the county of Licking and State of Ohio, have invented certain new and useful Improvements in Apparatus for Producing Acetylene or other Gas, of which the following is a specification.

My invention relates to improvements in apparatus for generating acetylene or other gas, and has for its object to provide a simple, cheap, and compact form of apparatus for producing the gas in a purified state and in which a predetermined amount of gas required may be generated and the amount contained within the apparatus be automatically regulated to furnish a uniform supply.

The improvements consist of the construction and combination of parts herein described, and pointed out in the annexed claim.

The drawing herewith, forming a part of this specification, represents a vertical sectional view of an embodiment of my invention, and referring to the same—

1 designates an outer tank open at its top, and immovably supported in the upper part of the same is an inner tank 2 also open at its top, with a space between the sides of the two. About midway in the tank 2 are two horizontal closed partitions or diaphragms 3 and 4, forming an intermediate chamber 5 therein, leaving a cooling and condensing chamber 6 in the lower part of said tank 2 and a space 7 in its upper part. The chamber 5 constitutes a purifying and condensing chamber and is provided with baffle-plates or walls 8, forming a compartment or compartments 9 9 to receive carbon or other purifying material and passages 10 10. In the bottom of the compartments 9 9 are short tubes or openings 11 11, communicating with chamber 6, and in the upper diaphragm or partition 4 is a short tube or opening 12, having a check-valve 12′, leading from the chamber 5 to the space 7 in the upper part of tank 2. Suitable covers 9ᵃ 9ᵃ are provided for compartments 9 9, so that the material therein may be removed or replaced.

In the lower part of tank 1 is placed any suitable form of generator or retort 13, provided with a spray-pipe 4, connected with a supply-pipe 14ᵃ and having valve 15 for controlling the same. The water or other liquid to be used in forming the gas may, if desired, be taken from the tank 1 by a pipe 16. A pipe 17 leading from the retort or generator conducts the gas from the retort to chamber 6, a check-valve 18 being provided in the pipe to prevent a backflow of the gas into the retort. A distributing-pipe 19, having a stop cock or valve 20, connects with the bottom of space 7 and conveys the gas to the place where it is to be used. An escape or relief pipe 21, having a valve 22, is also connected with the bottom of space 7.

Arranged between the outer tank 1 and inner tank 2 is an inverted receiver or gasometer 23, having an ear or lug 24, that upon the rising of the gasometer a predetermined distance strikes or engages a nut 25, adjustable on a movable rod 26, connected with and operating valve 15 in the supply-pipe. A similar lug 27 on the gasometer engages an adjustable nut 28 on rod 29, connected with and operating the valve 22 in the relief or escape pipe 21. The rods 25 and 27 move in guides 30.

In operation the tank is filled nearly to its top with water or other liquid, and a carbid or other gas-producing substance is placed in the retort. The amount of gas required having been ascertained and the valve 15 in the supply-pipe and nuts 25 and 28 all three correspondingly adjusted, the supply-pipe is opened. The gas generated in the retort passes through pipe 17 into chamber 6, through openings 11 11 and into the purifying chambers or compartments 9 9, down between the baffle or condensing plates 8 8, and out through the opening 12 into the space 7 in the upper part of the apparatus, from which it is carried by pipe 19 to the place to be used. Should the amount of gas generated exceed that required or consumed, the gasometer will rise, bringing the lug 24 against the nut 25 and, through rod 26, the valve 15 will be automatically operated to cut off the supply of the generating fluid. If after the supply has been thus cut off the gas continues to form, the gasometer will continue to rise, so that the lug 27 will engage nut 28 and through rod 29 open valve 22 in the relief or escape pipe and thereby permit the excess gas to escape.

What I claim, and desire to secure by Letters Patent, is—

In a gas-generator, the combination of tank 1, tank 2 supported within tank 1 with a space between the two, the said tank 2 having closed partitions or diaphragms 3 and 4 forming closed chamber 6 in the lower part of the tank, intermediate chamber 5 and space 7 in its upper part, with openings 11 11 in diaphragm 3 and opening 12 with a check-valve in diaphragm 4, baffle-plates or walls 8 8 in chamber 5 forming compartment or compartments 9 9 and passages 10 10, distributing-pipe 19 leading from space 7, escape or relief pipe 21 having a valve 22 also leading from space 7, a retort or generator in the lower part of tank 1, a liquid or fluid supply pipe opening into the retort, a valve 15 in said supply-pipe, an inverted receiver or gasometer arranged between tanks 1 and 2 having ears or lugs 24 and 27, movable rods 26 and 29 connected respectively with valves 15 and 22, and adjustable nuts 25 and 28 on said rods adapted to be engaged by lugs 24 and 27, substantially as shown and described.

JOHN L. STYRON.

Witnesses:
CHAS. FOLLETT,
W. A. SLAUKER.